(No Model.)

G. DUNCAN.
CAR WHEEL LOCK.

No. 304,262. Patented Aug. 26, 1884.

Witnesses
R. H. Campbell
W. W. Hanscom

Inventor
George Duncan

UNITED STATES PATENT OFFICE.

GEORGE DUNCAN, OF DUNEDIN, OTAGO, NEW ZEALAND.

CAR-WHEEL LOCK.

SPECIFICATION forming part of Letters Patent No. 304,262, dated August 26, 1884.

Application filed December 22, 1883. (No model.)

*To all whom it may concern:*

Be it known that I, GEORGE DUNCAN, a subject of the Queen of Great Britain, residing at Dunedin, Otago, New Zealand, have invented a new and useful Improvement in Locks for Wheels of Railway-Cars, of which the following is a specification.

My invention relates more particularly to the locking of wheels on cars of railways that have steep grades, where the cars have to be stopped and started on an incline or grade. The usual method is to stop the cars with brakes, which, when in action, prevent movement of the cars in either direction, so that when power is applied for starting the train the brakes have to be loosened just at the proper moment to prevent the cars from running backward, or so that an excess of power may not be required in starting. If the brakes are loosened too soon, the train will run backward and cause a great shock when the power is applied, or if not loosened soon enough an extra amount of power will be demanded; and in the case of railways operated by endless cables an injurious strain will be brought upon the cable to its serious damage.

The object of my invention is to obviate this danger and yet hold the car firmly when on an incline, at the same time allowing the cars to be started up the grade without requiring them to be exact in loosening the brakes. This I attain by attaching to the axle of the car a ratchet-wheel and to the body of the car or other part distinct from the axle a pawl, one end of which will drop into and fit the teeth of the ratchet, and the pawl is so placed in reference to the ratchet that when the pawl is in action the ratchet can only turn in one direction, and that in the direction up the incline. If it is desired to run the car up an incline in either direction, or either end first, two ratchets may be placed on one axle with the pawls arranged in opposite directions; or a ratchet may be placed on one axle with the pawl acting in one direction, and another ratchet placed on another axle with the pawl for that ratchet acting in the other direction, and connecting the two pawls together by suitable mechanism, so that either pawl may be put in action or both pawls thrown out of action.

Figure 1:
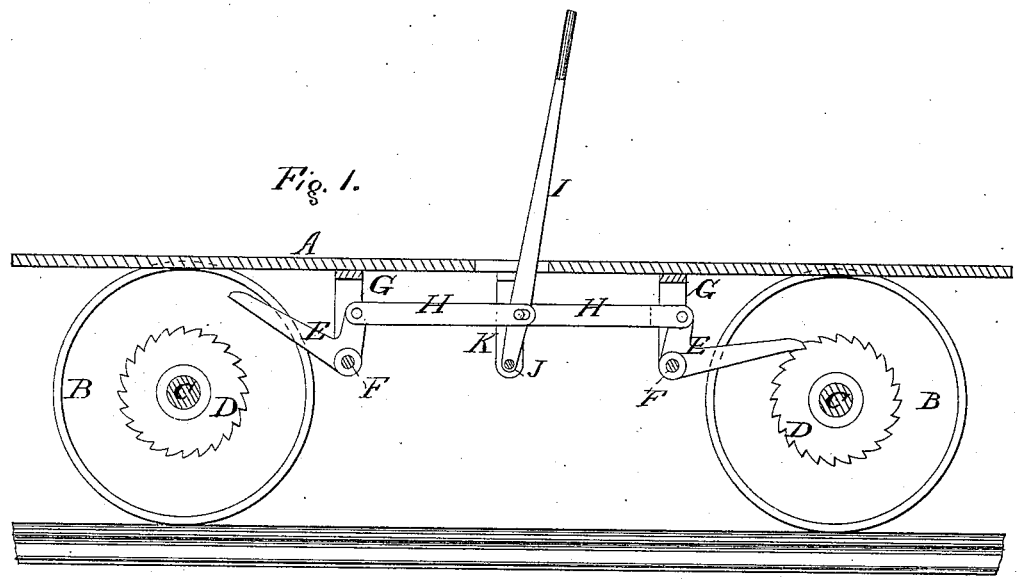
Figure 2:
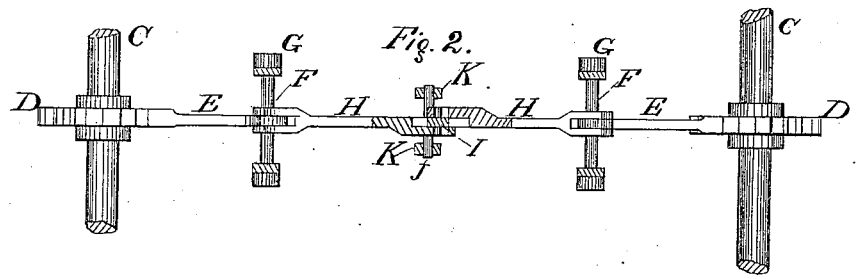
Figure 3:
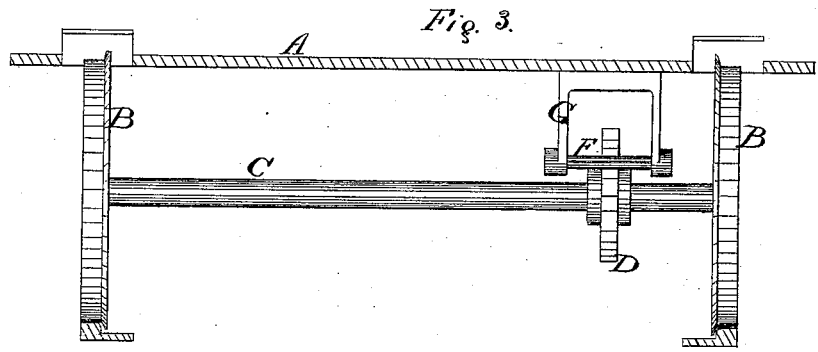

My invention is illustrated by the accompanying drawings, in which Figure 1 is a longitudinal sectional elevation of a car with the apparatus attached. Fig. 2 is a plan of the ratchets and pawls and mechanism for operating them; and Fig. 3 is a cross-section of the car, showing more particularly a side view of one of the hangers for carrying part of the mechanism.

Similar letters refer to like parts in all the figures.

A represents the platform or floor of a car; B B, the wheels, and C the axle, on which is securely fastened the ratchet D, with teeth so formed that the pawl E, which acts upon them, may be hinged on the side of the axle toward the center of the car.

F is the shaft on which the pawl E is hinged, and is carried by the hanger G, which is fastened to the car or some part distinct from the axle.

H is a link extending from a short arm on the pawl E to a lever, I, which is fulcrumed on the shaft J, carried by the hanger K. The pawl E is shown engaged with the ratchet D, which can turn in the direction in which the car is moving. The lever I in this case leans toward the direction in which the car is moving. By means of the lever I the pawl is thrown either in or out of action. In the drawings, pawls and ratchets are attached to both axles, and both pawls are connected to the lever I, so that either pawl may be put into action; or both may be kept out of action at the same time by moving the lever to a vertical position. A quadrant with notches and spring-catch may be used for retaining the lever I in any desired position.

If desired, two ratchets may be placed upon the same axle, and pawls adapted to act upon them in either direction may be arranged similar to the feed-motion of a metal-planing machine for machine-shops.

Having thus explained my invention, what I claim, and desire to secure by Letters Patent, is—

1. The combination of the car A, the wheels B B, axles C C, and ratchets D D with the pawls E E, shafts F F, hangers G G, links H H, lever I, and hanger K, substantially as described, and for the purpose set forth.

2. The combination of the car A and axles C with the ratchets D, pawls E, and lever I for actuating the same, substantially as described and set forth.

GEORGE DUNCAN.

Witnesses:
W. W. HANSCOM,
P. H. CAMPBELL.